Oct. 25, 1932.   F. H. OWENS   1,884,167
OPTICAL PRINTER
Filed June 10, 1929

INVENTOR.
FREEMAN H OWENS
BY Philip S. Hopkins
ATTORNEY

Patented Oct. 25, 1932

1,884,167

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

OPTICAL PRINTER

Application filed June 10, 1929. Serial No. 369,891.

My invention relates to an optical printer for motion picture film and particularly to a type of printer especially adaptable for the printing of photographic sound records from a negative to a positive film.

It is the primary object of my invention to provide a printer by means of which, the exposure of the images on the negative film may be made upon the positive film continuously and synchronously and at a high rate of speed.

An important object of my invention lies in the provision of a novel film moving means, consisting essentially in a single sprocket provided with a removable and adjustable toothed end for engaging one of the films. Such an adjustable sprocket makes possible the elimination of a difficulty heretofore encountered in continuous pictures, namely, that of compensating for the shrinkage of the negative film moved by the same sprocket as the nonshrunk positive film.

This adjustable sprocket also provides means whereby any one of a plurality of sound records on a single strip of film may be printed upon a positive film and if desired, the printed record increased in width over the negative record.

Another object in my invention lies in the provision of novel means whereby a single sprocket may be utilized whereby to move the negative and positive films simultaneously, the projection of the images or sound record being through the center of the sprocket and at right angles to the teeth thereof, whereby the hurdling of the sprocket shaft by complicated lens systems is avoided.

Other objects and advantages in details of construction and arrangement of parts will be apparent as the description now proceeds, reference being had to the figures of the accompanying drawing forming a part of this application and wherein like reference numerals indicate like parts.

In the drawing:—

Figure 1:
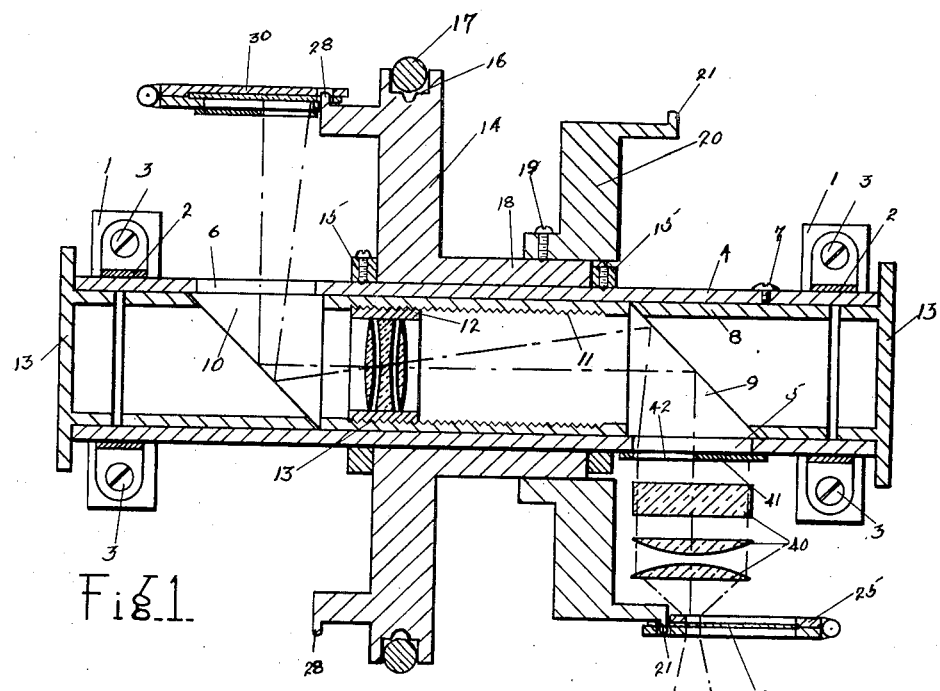
Figure 1 is a sectional plan view of my improved printer.

In carrying out my invention, I have provided a pair of spaced supporting posts 1 secured to which as by means of straps 2 secured to the posts 1 by means of the screws 3, is a tubular bearing 4. The bearing 4 is provided adjacent one end with a slit opening 5 and adjacent its other end and on the opposite side from the slit opening 5, with a slit opening 6. As will be obvious from the following description, however, the opening 8 may be on the same side as the slit opening 6.

Suitably secured within the tube 3 as by means of the set screw 7, is a sleeve 8 within which is mounted adjacent one end and in alignment and registry with the slit opening 5 a prism or other reflecting surface 9. The sleeve 8 also carried adjacent its opposite end in registry with the slit opening 6, a second prism or reflecting surface 10 adapted to receive images reflected from the prism 9 and to again reflect such images outwardly through the slit opening 6.

The sleeve 8 is threaded interiorly as at 11 and a threaded lens mount 12 is adjustable therein. A focusing lens system 13 is carried by the lens mount and serves to properly focus the reflected images from the prism 9 to the prism 10. The ends of the tubular bearing 4 may be closed by removable caps 13, permitting access to the interior of the tube.

Rotatably mounted upon the tubular bearing 4 is a sprocket 14 suitably held against movement along the tube 4 by means of guiding rollers 15 suitably adjustably secured on the tube 4.

Figures 2, 3:
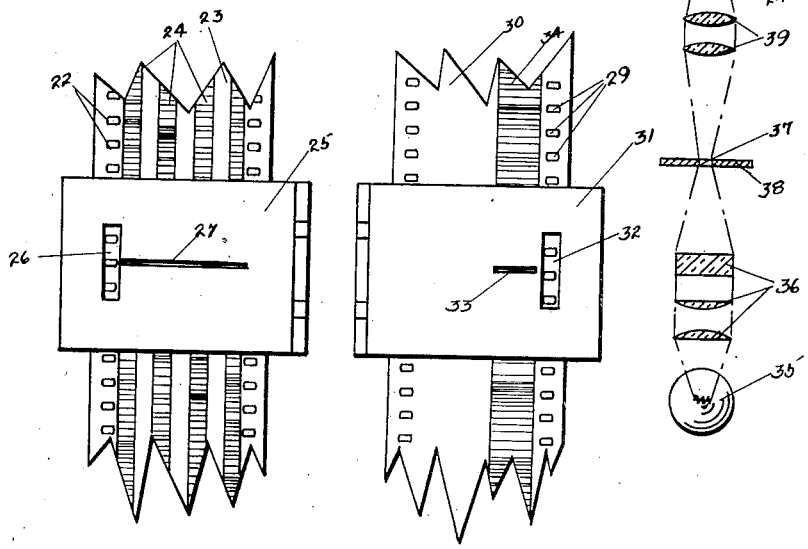
Figure 2 is a detailed view showing a section of negative film upon which a plurality of sound records have been recorded.
Figure 3 is a detail view of a section of motion picture film upon which only one of the sound records from the negative film has been printed and the width thereof increased.

The sprocket 14 is provided peripherally with the pulley groove 16 adapted to receive a belt 17 connected with any suitable source of power whereby the sprocket may be rotated upon the tubular bearing 4. The sprocket 14 is provided with a hub portion 18 upon which is adapted to be slidably mounted, as by means of the set screw 19, the removable sprocket end 20 provided with the sprocket teeth 21, engageable within the perforations 22 of a negative film 23 upon which may be one or more photographic sound records 24 as shown clearly in Figure 2. The film 23 is guided through a gate 25 at the point of engagement of the sprocket teeth 21, with said film, the gate being provided with a vertical slit 26 through which the teeth 21 may engage with the perforations of the film. The gate 25 is also provided with an elongated slit 27 extending across the gate and of a length sufficient to uncover the sound records 24 on the film 23 as the same is moved through the gate.

The sprocket 14 is also provided on its opposite end with sprocket teeth 28 adapted to engage with the perforations 29 of a positive film 30 moveable through a film gate 31 also provided with a vertical slit 32 through which the teeth 28 engage the perforations of the film. This film gate 31 is also provided with a slit 33 through which the projected and reflected images from the prism 10 are exposed upon the positive film to form the sound record 34 thereon.

A source of light such as the lamp 35 is provided and the rays from such lamp are passed through a condenser lens system 36 and through a narrow slit 37 in a suitable plate 38. The aerial image of the illuminated slit 37 is then focused by means of the focusing lens 39 upon one of the sound records 24 through the slit 27 in the film gate 25. The modulated light rays passing through the negative film 23 is then caught by a relatively large condenser lens system 40 and a selected portion of the rays passing from said condenser lens 40 is passed to the reflecting prism 9 through a mask 41 located at the focal point of the lens 12 provided with a slit 42. This mask may be positioned either adjacent the slit opening 5 or adjacent the slit opening 6, or may be provided at both positions as shown. This mask 41 may be adjustable or readily removable whereby to selectively determine the amount of the modulated light rays which shall pass into the tube 4 and to the prism 9. If it is desired to print upon the positive film 30 a sound record of greater width than the ordinary sound record on the negative film 23, the slit 42 in the mask 41 will be correspondingly larger than the slit 27.

As already indicated, the light rays reaching the prism 9 will be reflected through the sleeve 8 within the tube 4, focused by the lens 13 upon the prism 10 and again reflected outwardly through the slit opening 6 to the film 30 through the film gate 31. Thus the photographic sound record 24 may be rapidly and continuously printed from the negative film to the positive film.

The diameter of the removable end 20 and teeth 21 of the sprocket 14 is preferably slightly less than the diameter of the opposite end of the sprocket 14 and teeth 28. This difference in diameter between the ends of the sprocket engaging the negative and positive films respectively is to compensate for the shrinkage which takes place in a processed negative film and which of course is not present in the positive film. In Figure 1 this difference in the diameter between the ends of the sprocket is greatly exaggerated in order that it may cleary be shown. As a matter of fact, however, the difference is very slight and the amount can actually be determined only by micrometer measurements.

By means of the removable and adjustable end 20 of the sprocket 14, it is readily possible to make substitutions and provide sprocket ends for the negative film of a diameter best suited for the shrunk negative film, it being understood that a supply of such removable sprocket ends 20 of different diameters will be available so as to accommodate the different negative films in different conditions and states of shrinkage. Thus it is possible with my improved printer to promptly and easily take care of this shrinkage problem and permit the continuous rapid printing of sound records, or for that matter, of visual picture images from negative to positive films.

Another distinct advantage of the adjustable sprocket end 20 is that because of its adjustability, it can be positioned longitudinally upon the hub 18 of the sprocket 14 thus making possible the shifting of the film gate 25 so as to bring one of a plurality of the sound records 24 on the negative film 23 into registry and alignment with the lens system and the slit 27.

Of course, many changes may be made in details of construction and operation without departing from the spirit and scope of my invention. I do not limit myself therefore, to the exact form herein shown and described other than by the appended claims.

I claim:

1. An optical printer comprising a single moving member having toothed ends adapted to engage and move films in definite laterally spaced relation, one of said ends being adjustable with respect to the other, means for illuminating one film, and means to pass light from the illuminated film to the other film.

2. An optical printer comprising a single moving member having toothed ends adapted to engage and move films in definite laterally spaced relation, one of said ends being removable, means for illuminating one film and means to pass light from the illuminated film to the other film.

3. An optical printer comprising a single moving member having toothed ends adapted to engage and move films in definite laterally spaced relation, one of said ends being adjustable and removable with respect to the other, means for illuminating one film, and means to pass light from the illuminated film to the other film.

4. An optical printer comprising a single moving member adapted to engage and move films in definite laterally spaced relation, means for illuminating one film, a lens to pass a beam of light from said illuminated film to the other film and means for controlling the size of the light beam passing through said lens.

5. An optical printer comprising a single moving member adapted to engage and move films in spaced relation, means for illuminating one film, a lens to pass a beam of light from said illuminated film to the other film, and a condenser lens between said illuminated film and said first named lens.

6. An optical printer comprising a single moving member adapted to engage and move films in spaced relation, means for illuminating one film, a lens to pass a beam of light from said illuminated film to the other film, and a condenser lens between said illuminated film and said first named lens, and means between said lenses for controlling the size of the light beam reaching said first mentioned lens.

7. An optical printer comprising a single moving member adapted to engage and move films in spaced relation, means for illuminating one film, a lens to pass a beam of light from said illuminated film to the other film, and a condenser lens between said illuminated film and said first named lens, and means between said lenses for controlling the size of the light beam reaching said first mentioned lens, said first mentioned lens being adjustable for focusing.

8. An optical printer comprising a single moving member adapted to engage and move films in spaced relation, means including a light, lenses and a slit for illuminating a portion of one of said films, a lens to pass the light from said illuminated portion to the other film, said film moving and supporting member having a part adjustable whereby to bring anyone of a plurality of sound records on said illuminated film into alignment with said illuminating means.

9. An optical printer comprising a single moving member adapted to engage and move films in spaced relation, means including a light, lenses and a slit for illuminating a portion of one of said films, a lens to pass the light from said illuminated portion to the other film, said film moving and supporting member having a part adjustable whereby to bring anyone of a plurality of sound records on said illuminated film into alignment with said illuminating means, and means interposed between said illuminated film and said lens for governing the size of the light beam passing through said lens.

10. An optical printer comprising a single moving member adapted to engage and move films in spaced relation, means including a light, lenses and a slit for illuminating a portion of one of said films, a lens to pass the light from said illuminated portion to the other film, said film moving and supporting member having a part adjustable whereby to bring anyone of a plurality of sound records on said illuminated film into alignment with said illuminating means, and means interposed between said illuminated film and said lens for governing the size of the light beam passing through said lens, said means including a condenser lens and a mask.

In testimony whereof, I affix my signature.

FREEMAN H. OWENS.